Sept. 6, 1938. J. L. R. BANCONS 2,129,113
DEVICE FOR THE TRANSPORTATION AND DISTRIBUTION OF LIQUIDS
Filed Feb. 11, 1937 2 Sheets-Sheet 1
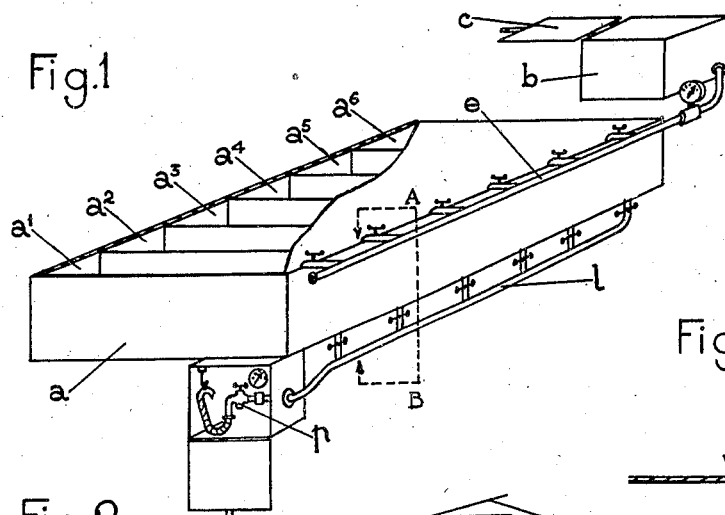
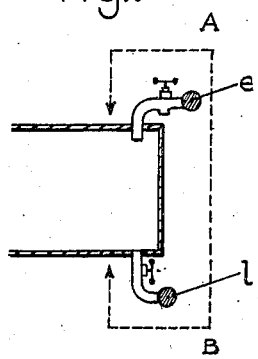
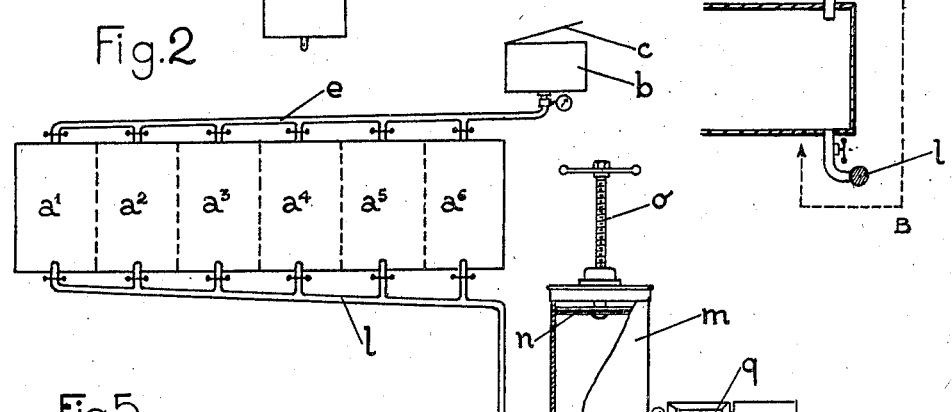
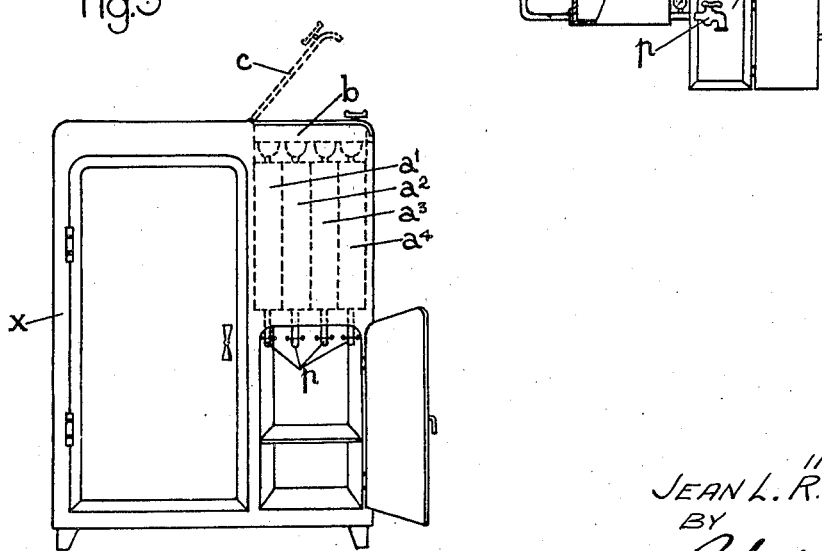
INVENTOR
JEAN L. R. BANCONS
BY
Richards & Geier
ATTORNEYS Sept. 6, 1938.  J. L. R. BANCONS  2,129,113
DEVICE FOR THE TRANSPORTATION AND DISTRIBUTION OF LIQUIDS
Filed Feb. 11, 1937  2 Sheets-Sheet 2
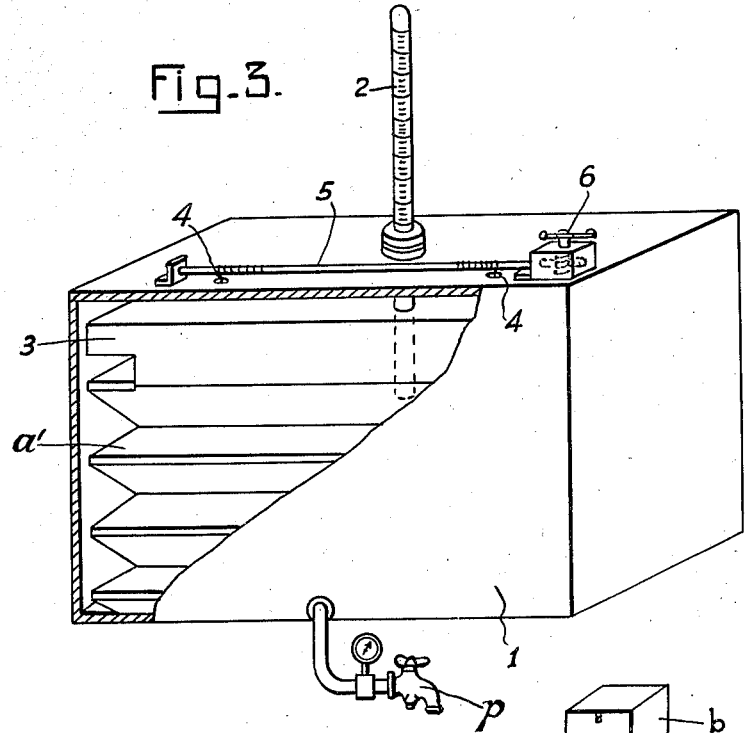
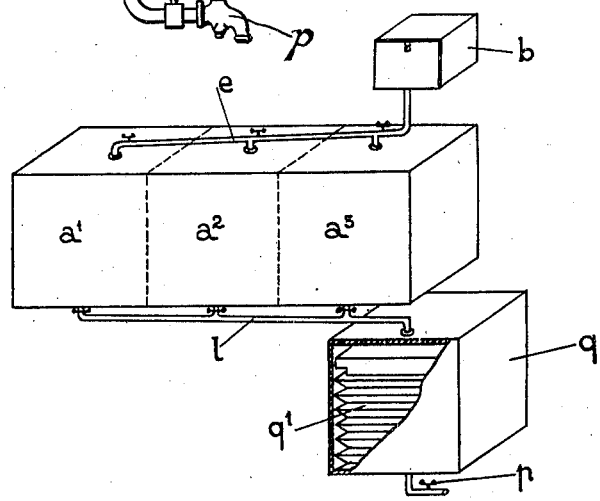
INVENTOR
JEAN L. R. BANCONS
BY
Richards & Geier
ATTORNEYS Patented Sept. 6, 1938

2,129,113

UNITED STATES PATENT OFFICE 2,129,113

DEVICE FOR THE TRANSPORTATION AND DISTRIBUTION OF LIQUIDS

Jean Louis Roger Bancons, Dax, France

Application February 11, 1937, Serial No. 125,181
In France February 12, 1936

6 Claims. (Cl. 221—100)

The invention has for its object a device for storing and distributing liquids which is intended to reduce the bulk of the preparation and of the housing and the difficulties of transport of liquid substances (wine for example) while facilitating the transactions between the producers and the consumers, passing if necessary through the intermediary of third parties, in particular the retailers.

The installation can be placed on all vehicles (boats and aeroplanes included) and very substantially decreases the shaking and mixing caused by the jolts and which are so harmful to liquids (milk in particular) during their transportation.

Said installation comprises simple or multiple reservoirs provided with a system of partitions and a series of pipes, cocks or valves permitting the simultaneous or separate reception or distribution of a plurality of different liquids, such as wine, beer, milk, oil, etc. stored in separate compartments which may either be doubled or not.

To said reservoirs or compartments there may be added one or a plurality of meters, as well as graduated or nongraduated gauges.

In certain cases, the system can include connecting tubes which place the filling tubes in communication with the emptying tubes to enable the whole piping to be completely cleaned without there being contact with the contents of the various compartments and without actuating the inlet and outlet meters.

To avoid jolting the liquids during transportation, the reservoirs or compartments, or adjacent receptacles coupled with same, can have a movable horizontal partition adapted to follow the free level of the liquid so as to prevent the shaking of the liquid in the incompletely filled compartments. For the same purpose, the compartments or associated receptacles can be constructed as an extensible reservoir to ensure the stability of the liquids and prevent their being shaken during transport.

The accompanying drawings show, by way of examples, various embodiments of the system which is the object of the invention.

Fig. 1 of said drawings shows in perspective the simple apparatus arranged horizontally, more particularly intended for automobile vehicles or to be mounted on a support. Fig. 1ᵃ is a detail view thereof in section along A—B.

Fig. 2 is a diagrammatic general view of a system of storing and distributing reservoirs with an associated reservoir provided with a piston device for stabilizing the liquid.

Fig. 3 shows in perspective view an installation having a single reservoir of extensible capacity.

Fig. 4 is a general view of a multiple reservoir installation having an associated emptying reservoir of extensible capacity.

Fig. 5 shows the application of the system to a refrigerator or cold storage cupboard.

As can be seen in the example showing the principle, illustrated in Fig. 1, the apparatus has a multiple reservoir $a$, comprising a plurality of compartments $a^1$ $a^2$ $a^3$ $a^4$ $a^5$ $a^6$, etc., supplied by the filling station $b$ by means of the pipe $e$ and connected to an outlet pipe $i$ leading to a distributing cock $p$ lodged in a distributing chest or station $q$. The filling station $b$ and also the distributing station $q$ can be advantageously closed by doors such as $c$ which can be made theft-proof by means of special closure devices so that it is impossible to draw off the liquid stored or alter it in any manner.

The various compartments can either contain the same liquid, or different liquids.

The reservoir $a$, which can be simple or have multiple compartments as shown, can either be placed on any vehicle, or at a fixed point, for example in an underground chamber, in a cellar, in a shop, on a counter, or hooked on a wall or hung in any appropriate place. It can, according to requirements, be vitrified inside or coated with an unalterable and unoxidizable material, or it can even be covered inside and outside with an appropriate metal, aluminium for example, or with any other coating. It can also be cooled or heated by means of any inside or outside cooling or heating system.

Suitable arranged meters or gauges enable all useful inspections to be effected at any time and also the exact quantity to be ascertained of each category of liquid distributed or handled during a day, week, a month or a year.

In the arrangement of Fig. 2, the outlet pipe $i$ leading from the compartments $a^1$ $a^2$ $a^3$ $a^4$, opens into an associated cylindrical reservoir $m$ of suitable size, in which can move a piston $n$ of which the upward and downward movements are controlled by hand, for example by means of a screw $o$, or any other lever, rack, or counterweight system, etc. It is obvious that with this arrangement and if the dimensions of the cylinder $m$ are sufficient, all shaking and mixing of the liquid in the reservoirs can be avoided during transport, by moving the piston downwards in the cylinder the required amount to hold the liquid stationary.

This movable piston or partition device could also be arranged in the reservoirs or compartments themselves.

Fig. 3 shows a single reservoir $a$, wherein the storage receptacle comprises an extensible bellows $a^1$ made of suitable material lodged in an outer casing $l$, in which it can be suitably guided and held. Said extensible reservoir can have any associated members, such as valves, meters, inspection or cleaning members, etc. A thermometer 2 (or a gauge) has been shown in the drawings.

To the upper wall 3 of the extensible reservoir are fixed one or two cables 4, projecting outside the casing $l$ and rolled around an outer shaft 5 which can be rotated through an appropriate transmission by means of an outer handle 6. The weight of the bellows and, in particular that of its upper part 3, is such that the capacity of the bellows is always practically equal to the volume of the liquid stored. A suitable catch mechanism can, however, be provided if desired for holding the bellows in the extended state into which it has been brought by the control.

Any method of control, for example by means of a rack, a cam, a counterweight or the like, can be used for operating the extensible bellows.

Fig. 4 shows an installation in which the extensible reservoir having a bellows $q^1$ forms an associated reservoir lodged in the lower emptying station $q$ of the installation, which in this case includes three compartments $a^1$ $a^2$ $a^3$, the distributing pipe $l$ opening into said associated reservoir. Said extensible associated reservoir could also be lodged in the upper storing station $b$. It will be seen that the operation of the bellows of said upper or lower associated reservoir, will ensure the stability of the liquid during transport.

The extensible reservoirs having bellows either arranged in the compartments of the storage reservoir, or forming associated reservoirs, are lodged inside casings in which they are suitably held by any guiding system, operating by means of rods, levers or other appropriate members, so as to give the bellows sufficient rigidity during the transport of the liquids, mainly in the case of reservoirs with high capacity. They could also advantageously be provided with spring shock absorbers and with valves, for preventing the jolts or outside movements from causing an unwanted extension of the bellows. The casings surrounding the extensible reservoirs could also be made hermetic and receive air under pressure which would act on the bellows to hold it in the required position.

Suitable communications provided with cocks or other closure members could be provided to connect, for example at their end, the inlet and outlet pipes $e$ and $l$ of the installation, so as to enable the whole piping to be cleaned, as well as the reservoirs.

Appropriate air intake members, valves or the like, which can be automatic or not, will also advantageously be mounted on the reservoirs or the reservoir compartments, so as to enable them to be filled and emptied conveniently.

The system can also be applied to all installations for preserving any liquids; Fig. 5 shows the application to a refrigerator or cold storage cupboard. In this arrangement the compartments $a^1$ $a^2$ $a^3$ $a^4$ are arranged in a lateral chest forming a cupboard associated with the refrigerator $x$ so that it is not necessary to open the door of the latter to draw off the liquids stored, by means of the cocks $p$. The filling of the compartments can be advantageously effected through the door $c$ of the upper chest $b$.

It is obvious that numerous modes of application and of construction can be devised and that the constructional details which have been illustrated and described herein have only been given by way of examples and that the invention is capable of any modifications.

What I claim and desire to secure by Letters Patent of the United States is:

1. A device for transporting and distributing liquids, said device comprising a container adapted to be mounted upon a vehicle and having a plurality of compartments, a filling station, at least one pipe connecting said compartments with said filling station, at least one valve carried by said pipe, a distributing station, a hollow container, means connecting said container with said compartments, a pipe connecting said container with said distributing station, a valve carried by said pipe, and means connected with said container for varying the volume of its interior to stabilize a liquid within said compartments and to prevent its movement during transportation.

2. A device for transporting and distributing liquids, said device comprising a container adapted to be mounted upon a vehicle and having a plurality of compartments, a filling station, at least one pipe connecting said compartments with said filling station, at least one valve carried by said pipe, a hollow container, means connecting said container with said compartments, said container constituting a distributing station, and means connected with said container for varying the volume of its interior to stabilize a liquid within said compartments and to prevent its movement during transportation.

3. A device for transporting and distributing liquids, said device comprising a container adapted to be mounted upon a vehicle and having a plurality of compartments, a filling station, at least one pipe connecting said compartments with said filling station, at least one valve carried by said pipe, a distributing station, a hollow, container, a movable wall situated within said container, means connected with said wall for moving the same within said container to follow the movement of a liquid therein and for maintaining said wall in a predetermined position during transportation to stabilize the liquid, and means connecting said container with said compartments and said distributing station.

4. A device for transporting and distributing liquids, said device comprising a container adapted to be mounted upon a vehicle and having a plurality of compartments, a filling station, at least one pipe connecting said compartments with said filling station, at least one valve carried by said pipe, an extensible container having the form of bellows, means connecting said container with said compartments, said container having an upper wall, and means connected with said container for moving said wall to bring it in contact with a liquid filling the container and for maintaining said wall in this position during the transportation of the liquid to stabilize the same.

5. A device for transporting and distributing liquids, said device comprising an extensible hollow container having the form of bellows, said container being adapted to be mounted upon a vehicle, at least one pipe communicating with the interior of said container for introducing or removing a liquid, said container having a cover, and means connected with said container for changing the volume of its interior and thereby moving said cover in contact with the surface of the liquid filling the container, said means maintaining said cover in contact with said surface during transportation to stabilize the liquid.

6. A device for transporting and distributing liquids, said device comprising a plurality of substantially low and flat containers adapted to be placed in the lower portion of a vehicle, a filling station situated upon a higher level than the level of said containers, at least one pipe connecting said compartments with said filling station, at least one valve carried by said pipe, a distributing station situated at a lower level than that of said containers, another container, means connecting the last-mentioned container with the first-mentioned containers and with said distributing station, and means connected with the last-mentioned container for varying the volume of its interior to stabilize a liquid within the first-mentioned containers during transportation.

JEAN LOUIS ROGER BANCONS.